Nov. 11, 1941.  A. D. SIEDLE  2,262,658

REFRIGERATION

Filed Dec. 31, 1938  2 Sheets-Sheet 1

INVENTOR
Arnold D. Siedle

BY
Harry S. Dumaree
ATTORNEY

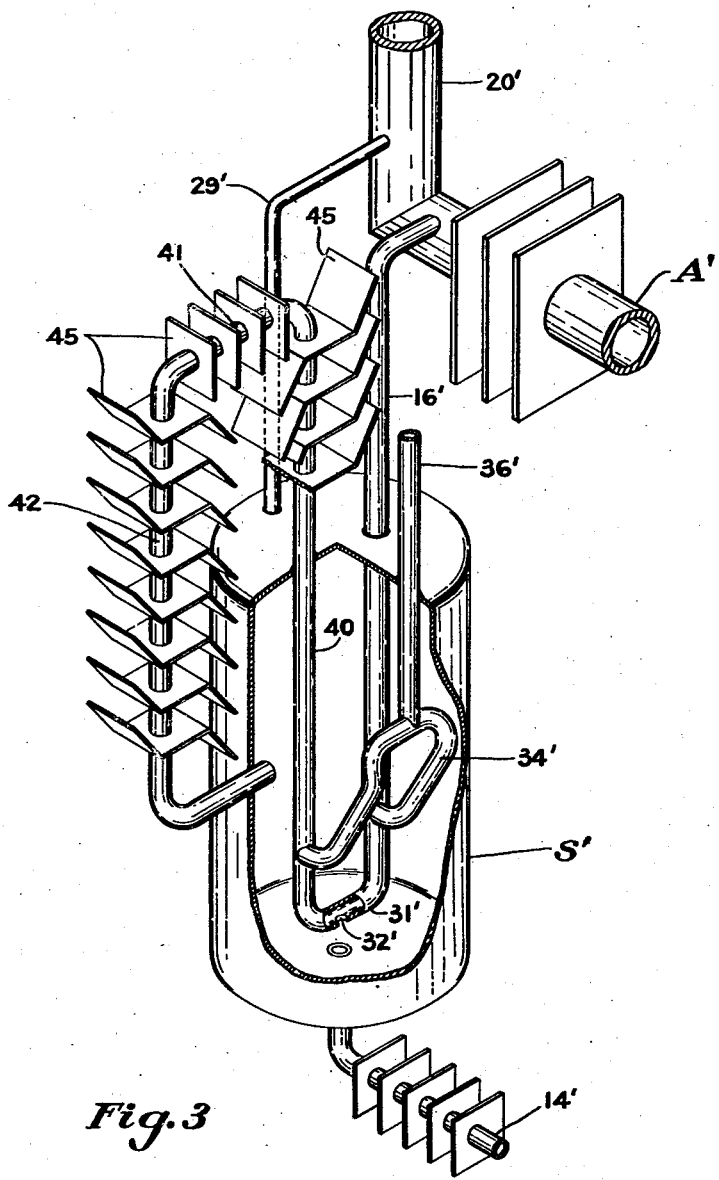

Patented Nov. 11, 1941

2,262,658

UNITED STATES PATENT OFFICE 2,262,658

REFRIGERATION

Arnold D. Siedle, Canton, Ohio, assignor to The Hoover Company, North Canton, Ohio, a corporation of Ohio Application December 31, 1938, Serial No. 248,700

13 Claims. (Cl. 62—119.5)

This application relates to the art of refrigeration and more particularly to an improvement in absorption refrigerating systems of the three-fluid type.

In the co-pending case of Rudolph S. Nelson and Curtis C. Coons, Serial No. 118,284, filed December 30, 1936, now Patent No. 2,240,173, issued April 29, 1941, there is disclosed a refrigerating system in which the pressure equalizing medium is propelled by a motor driven fan and in which a portion of the pressure equalizing medium is diverted from its main circuit into a gas lift pump for circulating the absorption solution. In the operation of this system it has been found that pressure and liquid level fluctuations which occur under certain conditions of operation may render the performance of the pump somewhat uncertain and produce erratic discharge therefrom.

Accordingly, it is a principal object of this invention to provide a system incorporating the gas lift pump arrangement of the aforementioned application which will render the pump independent of minor system disturbances.

It is a further object of this invention to provide an absorption refrigerating system of the type above referred to in which the absorption solution is circulated by means of a pump which has the intake thereof positioned directly within a solution reservoir.

It is a further object of the present invention to provide a refrigerating system of the type above referred to in which the parts constituting the solution circuit are so constructed and arranged that variations in the solution level will not adversely affect operation of the circulating pump.

It is a further object of the present invention to provide a refrigerating system of the above referred to character in which the solution reservoir and circulating pump are constructed and arranged in such fashion that they may be placed within a refrigerating cabinet within space normally not useful.

It is a further object of this invention to provide an absorption refrigerating system of the above referred to character in which the solution is circulated by a gas lift pump having no small conduit connections between the pump inlet and the solution reservoir.

It is a further object of the present invention to provide an absorption refrigerating system of the three-fluid type in which the solution is circulated by a gas lift pump of the single, double or twin type.

It is a further object of the invention to provide an absorption refrigerating system in which one leg of a twin gas lift pump or of a double gas lift pump may be utilized merely to circulate the absorption solution collected in the reservoir through a local cooling circuit.

Other objects and advantages of the invention will become apparent as the description proceeds when taken in connection with the accompanying drawings in which:

Figure 3 is an enlarged sectional perspective view of a modified form of the detail construction illustrated in Figure 2.

Figure 1:
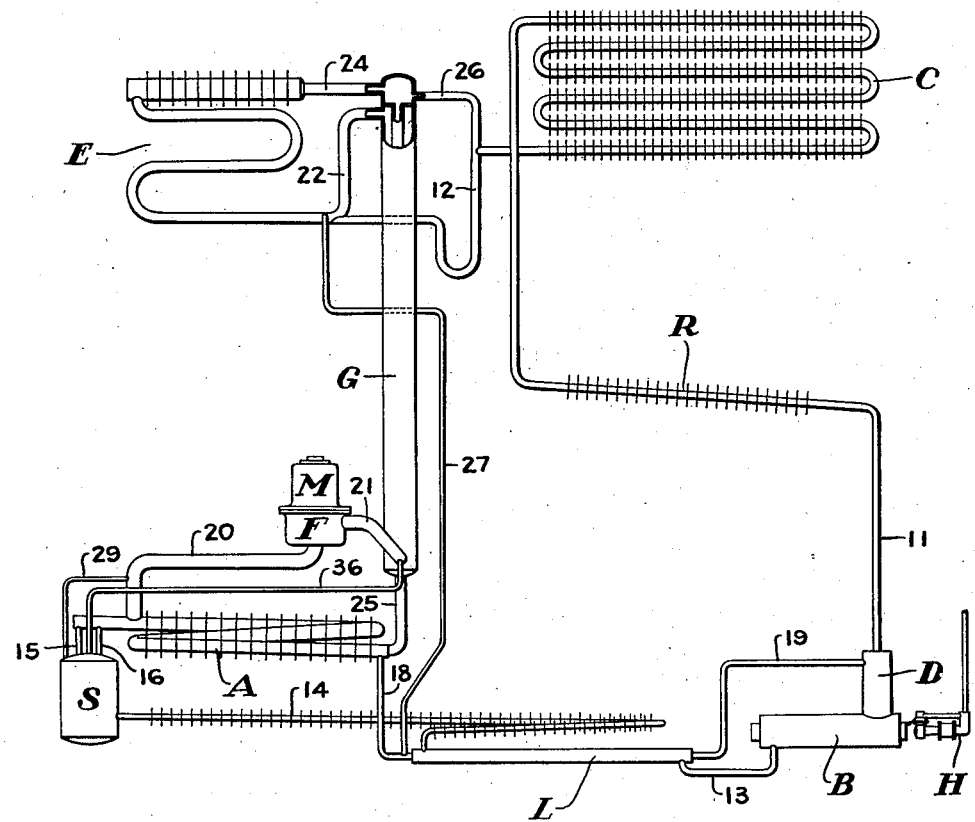
Figure 1 is a diagrammatic representation of an absorption refrigerating system embodying the present invention.

Referring now to the drawings in detail and first to Figure 1 thereof, there is illustrated a three-fluid absorption refrigerating system comprising a boiler B, an analyzer D, an air-cooled rectifier R, a tubular air-cooled condenser C, an evaporator E, a gas heat exchanger G, a liquid heat exchanger L, a tubular air-cooled absorber A, a solution reservoir S, a heater H for the boiler B, and a circulating fan F which is driven by an electrical motor M. The above-mentioned elements are suitably connected by a plurality of conduits to form a plurality of gas and liquid circuits constituting a complete refrigerating system to which reference will be made in more detail hereinafter.

The above described system will be charged with a suitable refrigerant, such as ammonia, a suitable absorbent, such as water, and an inert pressure equalizing medium, preferably a dense inert gas, like nitrogen.

The electrical motor M and the heater H for the boiler B may be controlled in any suitable or desired manner. It is preferred, however, to control the heater and the motor simultaneously in response to variations in temperature of the evaporator by a mechanism such as that illustrated in the co-pending application of Curtis C. Coons, Serial No. 148,424, filed June 16, 1937, now Patent No. 2,228,343, issued January 14, 1941.

The application of heat to the boiler B generates refrigerant vapor from the strong solution normally therein contained. The vapor so generated passes upwardly through the analyzer D in counterflow relationship to strong solution flowing downwardly therethrough. Further refrigerant vapor is generated from the strong solution by the heat of condensation of absorption solution vapor generated in the boiler B. The refrigerant vapor is conveyed from the analyzer D to the top portion of the condenser C by means of a conduit 11 which includes the air-cooled rectifier R. The rectifier serves to condense any vapor of absorption solution which may succeed in passing through the analyzer D. The refrigerant vapor supplied to the condenser is liquified therein by heat exchange with cooling air and is conveyed from the bottom portion of the condenser C to the bottom portion of the evaporator E through a conduit 12 which includes a U-shaped pressure balancing column forming section.

The weak solution formed in the boiler B by the generation of refrigerant vapor is conveyed therefrom into the solution reservoir S by means of the conduit 13, the outer path of the liquid heat exchanger L and a finned conduit 14 which also performs the function of precooling the lean solution. The absorption solution collecting in the reservoir S is elevated into the upper portion of the absorber A by means of the elevating conduits 15 and 16 of a twin gas lift pump which will be described in more detail hereinafter.

The lean solution supplied to the absorber flows downwardly therethrough by gravity in counterflow relationship to a mixture of pressure equalizing medium and refrigerant vapor flowing upwardly therethrough. The refrigerant vapor content of the mixture is absorbed by the solution and the heat of absorption rejected to cooling air flowing over the exterior walls of the absorber vessel. The strong solution formed in the absorber is drained from the bottom portion thereof into the upper portion of the analyzer D by means of conduit 18, the inner path of the liquid heat exchanger L and a conduit 19, thus completing the absorption solution circuit.

The lean gas formed in the absorber is conveyed from the upper portion thereof into the suction inlet of the circulating fan F through a conduit 20. The gas is placed under pressure by the fan F and is conveyed therefrom to the bottom portion of the evaporator E by way of a conduit 21, the outer path of the gas heat exchanger G and the conduit 22 which joins the bottom portion of the evaporator adjacent its point of connection with the liquid refrigerant supply conduit 12.

The inert gas supplied to the evaporator travels therethrough at a high velocity and serves to distribute the liquid refrigerant supplied to the bottom of the evaporator to all portions thereof as the liquid is evaporating into the gas to produce useful refrigeration. The evaporator may be of any desired construction and arrangement. A preferred construction is disclosed in the copending case of Curtis C. Coons and William H. Kitto, Serial No. 386,395, filed April 2, 1941. The rich gas formed in the evaporator E is conveyed from the upper finned box-cooling portion thereof into the top inner path of the gas heat exchanger G by means of the conduit 24. The rich gas is conveyed from the inner path of the gas heat exchanger into the bottom portion of the absorber A by means of the conduit 25. The rich gas then flows upwardly through the absorber A in counterflow to the absorption solution in the manner heretofore described.

The condenser side of the liquid line 12 is vented to the rich gas side of the gas heat exchanger by means of a conduit 26 and the bottom portion of the evaporator E is drained to the strong solution return line 18 by means of the conduit 27.

The solution reservoir S is vented to the suction conduit 20 of the inert gas fan by means of a small vent conduit 29.

Figure 2:
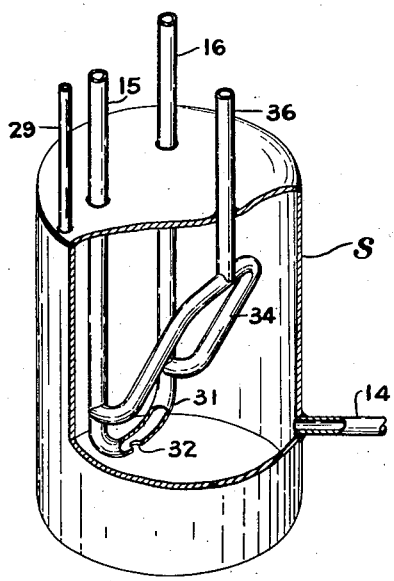
Figure 2 is a partial sectional perspective view on an enlarged scale of a detail of the system illustrated in Figure 1.

Referring now to Figures 1 and 2, the reservoir and its associated pumping mechanism will be described in detail. The pumping conduits 15 and 16 are joined at their bottom portions by a bight conduit 31 which is provided with a small liquid inlet opening 32 in its bottom portion. Each of the conduits 15 and 16 is connected to one leg of an inverted U-shaped gas supply conduit 34. The point of connection between the conduits 15, 16 and 34 lie below the liquid level normally prevailing in the solution reservoir. The bight portion of the U-shaped conduit 34 is connected to a gas supply conduit 36 within the solution reservoir S. The other end of the conduit 36 connects to the inert gas discharge conduit 21 of the circulating fan F. As a result of this construction the solution supplied to the reservoir S is elevated alternately through the conduits 15 and 16 into the absorber A by gas lift action. The twin gas lift pump of the type herein disclosed is fully described and claimed in the co-pending application of Curtis C. Coons and Rudolph S. Nelson, Serial No. 169,986, filed October 20, 1937, now Patent No. 2,240,176, issued April 29, 1941.

Due to the fact that the vent 29 connects directly to the suction inlet of the circulating fan and the inert gas supply conduit 36 connects directly to the discharge conduit of the fan, the maximum pressure differential and the most constant pressure differential available in the system is utilized for operating the twin gas lift pump which tends to stabilize the operation thereof under all conditions.

Referring now to Figure 3, there is disclosed a modified form of the solution reservoir and pumping mechanism. Certain portions of this apparatus are identical with elements described in connection with Figures 1 and 2 and are given the same reference characters primed.

In this form of the invention the conduit 15 is replaced by a conduit 40 which passes upwardly through the top portion of the reservoir S' to the level of the point of connection between the conduit 16' and the absorber A' at which point the conduit 40 joins the laterally extending conduit 41. The conduit 41 joins a downwardly extending conduit 42 which enters the vessel S' beneath the top thereof but above the solution level normally contained therein. The external portions of the conduits 40, 41 and 42 are provided with suitable air-cooling and heat-radiating fins 45.

The operation of this form of the invention is identical with the operation of that previously disclosed except that the solution elevated through the conduit 40 merely circulates through the cooling section of the conduit 40, the cooling conduits 41 and 42 and returns to the interior of the vessel S'. Thus, a portion of the solution supplied to the reservoir is continually circulated through a local cooling circuit whereby the effective temperature level of the solution supplied to the absorber is lowered which greatly improves the efficiency of the absorption process per se and of the apparatus as a whole. This local cooling circuit is highly efficient by reason of the fact that the absorption solution circulates therethrough at a rapid rate under somewhat turbulent conditions and in intimate contact with the interior walls of the small diameter conduits 40, 41 and 42, all of which serves to promote excellent heat rejection from the solution.

The operation of each form of the invention is substantially the same insofar as it is considered merely as a pump, namely, it is a twin gas lift pump; that is, a gas lift pump having two elevating legs connected at their bottoms with a common liquid inlet and also connected above their bottom portions but below the free surface of the liquid to be pumped to a common gas supply conduit. This type of pump discharges alternately from the two pumping legs thereof and an oscillating column of liquid is set up in the bight of connecting conduit 31 which greatly improves the efficiency of the pump. The bottom portion of the pump is actually submerged in a solution reservoir and the liquid is led thereinto simply through an opening in the cross-connecting or bight conduit at the bottom portion of two elevating conduits.

The present invention eliminates the necessity for the long small diameter conduits through which the liquid flows into the pump inlet in previous constructions. In the instant arrangement the pump inlet is submerged in a large body of the pumping liquid. This has been found to eliminate difficulties in the operation of the pump due to momentary variatons in the system pressure and in the liquid levels therein. The large reservoir in which the pump is submerged in the liquid practically eliminates the effect of such pressure changes and liquid level variations, and the absence of conduits feeding the liquid directly into the pump frees the pump from fluctuations which were due simply to the resistance of such conduits and of the inertia effect of the columns of liquid therein.

The objectionable pressure fluctuations and surging of liquid levels characteristic of previous systems utilizing a gas lift pump and a solution reservoir are, to all intents and purposes, totally eliminated by the present invention. This results from the cumulative effect of a number of factors. It will be noted that the pressure balancing column in the condenser evaporator liquid line 12 is supported by the pressure differential existing between the gas inlet and outlet portions of the evaporator because of the fact that the condenser side of this system is vented directly to the low pressure or rich gas side of the gas heat exchanger in which the pressure is only slightly above the suction pressure of the fan. Also the reservoir S is directly vented to the suction conduit of the fan. This arrangement places substantially the entire solution circuit under the nearly constant suction pressure of the fan which tends to eliminate surging in the circuit. The gas lift pump itself is encased within the reservoir and is fed directly from a large body of solution. The inertia of this large body of solution and the elimination of small diameter conduits supplying liquid to the pump effectively iron out any pressure and level fluctuations which might occur despite the pressure equalizing mechanism provided by the venting system to shield the gas lift pump. Still another factor tending toward absolutely stable operating conditions for the pump results from the fact that the reservoir and the discharge ends of the pumping conduits 15 and 16 are vented directly to the suction side of the circulating fan and the gas supply conduit is connected directly to the discharge side of the circulating fan. As a result of this, the pump is operated under a very constant gas pressure differential. The circulating fan, which is preferably driven by an induction motor hermetically sealed within the system, operates at constant speed and develops a constant pressure differential.

In addition, the construction of the apparatus is simplified. In constructions in which the reservoir and gas lift pump are separate, eight welds are required to form the apparatus illustrated in Figure 2. According to the present invention nine welds are required, but three of the nine welds required by the instant invention are permanently housed within the system and are never subjected to a pressure differential greater than a few inches of water wherefore these welds may be made very simply and cheaply since they are not called upon ever to withstand any material or appreciable pressure differential. According to the present invention the number of welds which must withstand the system pressure, which in the case of three-fluid absorption refrigerating systems may range upwardly of 400 pounds per square inch, have been reduced from eight to six which results in an appreciable saving in material and labor and also reduces by two the number of joints which must be protected for high pressure operation.

Though the invention has been illustrated and described in connection with twin gas lift pumps of the double and single discharge type, it is by no means limited to such a construction. If desired, two gas lift pumps may be utilized to replace the twin gas lift pump disclosed in the present invention, or a single gas lift pump may be utilized. In the event that two gas lift pumps are utilized, both pumps may discharge into the the absorber or one of the same may be constructed merely as a circulating and cooling pump, such as the element 40 disclosed in Figure 3. However the pumps may be arranged the saving and improvements in efficiency and operation attributable to the present invention all flow through the same factors and are manifested in substantially the same manner.

While the invention has been illustrated and described herein in considerable detail, it is not to be construed as being limited to the precise construction and arrangement illustrated as various changes may be made in the construction, arrangement, proportion of parts without departing from the spirit of the invention or the scope of the appended claims.

I claim:

1. Gas lift pumping apparatus comprising a liquid receiver, a U-shaped pumping conduit having the bight portion adjacent the bottom portion of said receiver, a liquid inlet in the bight portion of said U-tube, an inverted U-tube within said receiver communicating with said U-tube above the bight portion thereof, and means for introducing pumping gas into the bight portion of said inverted U-tube.

2. Absorption refrigerating apparatus comprising a boiler, an evaporator, an absorber, means for liquefying refrigerant vapor produced in said boiler and for supplying the liquid to said evaporator, a solution reservoir, gas lift solution pumping means encased in said reservoir, means for circulating inert gas between said evaporator and said absorber, means including said reservoir and said gas lift pump for circulating absorption solution between said absorber and said boiler, and means for conducting pumping gas from said inert gas circulating means to said gas lift pump.

3. Absorption refrigerating apparatus comprising a boiler, an evaporator, an absorber, means for liquefying refrigerant vapor produced in said boiler and for supplying the liquid to said evaporator, means for circulating inert gas between said evaporator and said absorber, means arranged to conduct absorption solution in a circuit including said boiler and said absorber, said absorption solution conducting means including a gas lift solution circulating pump at least partially encased within another part of said conducting means, and means for conducting pumping gas from said inert gas circulating means into the encased portion of said gas lift pump.

4. Absorption refrigerating apparatus comprising a boiler, an evaporator, an absorber, means for liquefying refrigerant vapor produced in said boiler and for supplying the liquid to said evaporator, a solution reservoir, twin gas lift solution pumping means encased in said reservoir, means for circulating inert gas between said evaporator and said absorber, means including said reservoir and said twin gas lift pump for circulating absorption solution between said absorber and said boiler, and means for conducting pumping gas from said inert gas circulating means to said twin gas lift pump.

5. Absorption refrigerating apparatus comprising a boiler, an evaporator, an absorber, means for liquefying refrigerant vapor produced in said boiler and for supplying the liquid to said evaporator, means for circulating inert gas between said evaporator and said absorber, means arranged to conduct absorption solution in a circuit including said boiler and said absorber, said absorption solution conducting means including a twin gas lift solution circulating pump at least partially encased within another part of said conducting means, and means for conducting pumping gas from said inert gas circulating means into the encased portion of said twin gas lift pump.

6. Absorption refrigerating apparatus comprising a boiler, an evaporator, an absorber, means for liquefying refrigerant vapor produced in said boiler and for supplying the liquid to said evaporator, a solution reservoir, gas lift solution pumping means encased in said reservoir, means for circulating inert gas between said evaporator and said absorber, means including said reservoir and said gas lift pump for circulating absorption solution between said absorber and said boiler, means for conducting pumping gas from said inert gas circulating means to said gas lift pump, said gas lift pumping means including means for circulating a portion of the solution supplied thereto from said reservoir through a local solution cooling circuit.

7. Absorption refrigerating apparatus comprising a boiler, an evaporator, an absorber, means for liquefying refrigerant vapor produced in said boiler and for supplying the liquid to said evaporator, a solution reservoir, twin gas lift solution pumping means encased in said reservoir, means for circulating inert gas between said evaporator and said absorber, means including said reservoir and said twin gas lift pump for circulating absorption solution between said absorber and said boiler, and means for conducting pumping gas from said inert gas circulating means to said twin gas lift pump, one portion of said twin gas lift pump being connected to an air cooled solution cooling conduit which is positioned exteriorly of said reservoir and discharges thereinto to provide a local cooling circuit for absorption solution.

8. Absorption refrigerating apparatus comprising a boiler, an evaporator, an absorber, means for liquefying refrigerant vapor produced in said boiler and for supplying the liquid to said evaporator, means for circulating inert gas between said evaporator and said absorber, means arranged to conduct absorption solution in a circuit including said boiler and said absorber, said absorption solution conducting means including a part which accumulates solution in normal operation of the apparatus and a gas lift pump having its liquid inlet portion submerged in such collected body of solution, and means for conducting pumping gas from said inert gas circulating means to said gas lift pump.

9. Absorption refrigerating apparatus comprising a boiler, an evaporator, an absorber, means for liquefying refrigerant vapor produced in said boiler and for supplying the liquid to said evaporator, means for circulating inert gas between said evaporator and said absorber, means arranged to conduct absorption solution in a circuit including said boiler and said absorber, said absorption solution conducting means including a part which accumulates solution in normal operation of the apparatus and a twin gas lift pump having its liquid inlet portion submerged in such collected body of solution, and means for conducting pumping gas from said inert gas circulating means to said twin gas lift pump.

10. Absorption refrigerating apparatus comprising a boiler, an evaporator, an absorber, means for liquefying refrigerant vapor produced in said boiler and for supplying the liquid to said evaporator, means for circulating inert gas between said evaporator and said absorber, means arranged to conduct absorption solution in a circuit including said boiler and said absorber, said absorption solution conducting means including a part which accumulates solution in normal operation of the apparatus, a twin gas lift pump having its liquid inlet portion submerged in such collected body of solution, means for conducting pumping gas from said inert gas circulating means to said twin gas lift pump, said gas lift pumping means including means for circulating solution through a local cooling circuit.

11. In an absorption refrigerating apparatus an absorber, a generator, means for circulating an inert gas through a circuit including said absorber, means for conveying absorption solution from said boiler to said absorber and for returning absorption solution from said absorber to said boiler, said absorption solution conveying means including a gas lift circulating pump at least partially encased within another part of said absorption solution conveying means and wetted by the absorption solution therein contained, and means for supplying pumping gas from said inert gas circulating means to said gas lift pump.

12. Absorption refrigerating apparatus comprising an absorber, a boiler, an evaporator, means for liquefying refrigerant vapor produced in said boiler and for supplying the liquid to said evaporator, means for circulating inert gas between said absorber and said evaporator, means for conveying absorption solution to said absorber from said boiler and for conveying absorption solution to said boiler from said absorber including a gas lift circulating pump at least partially encased within another part of the apparatus, and means for supplying pumping gas from said inert gas circulating means to the encased portion of said apparatus.

13. Absorption refrigerating apparatus comprising a boiler, an evaporator, an absorber, means for liquefying refrigerant vapor produced in said boiler and for supplying the liquid to said evaporator, a solution reservoir, gas lift solution pumping means encased in said reservoir, power driven means for circulating inert gas between said evaporator and said absorber, means including said reservoir and said gas lift pump for circulating absorption solution between said absorber and said boiler, means for conducting pumping gas from said power driven inert gas circulating means to said gas lift pump, and means for maintaining said reservoir under a pressure approximating the suction pressure of said power driven inert gas circulating means.

ARNOLD D. SIEDLE.